(12) United States Patent
Gotoh et al.

(10) Patent No.: US 7,658,101 B2
(45) Date of Patent: Feb. 9, 2010

(54) RAINDROP DETECTION DEVICE

(75) Inventors: Kouichi Gotoh, Kariya (JP); Junichi Ishikawa, Kariya (JP)

(73) Assignee: Denso Corporation, Kariya (JP)

( * ) Notice: Subject to any disclaimer, the term of this patent is extended or adjusted under 35 U.S.C. 154(b) by 526 days.

(21) Appl. No.: 11/705,742

(22) Filed: Feb. 14, 2007

(65) Prior Publication Data

US 2007/0222997 A1    Sep. 27, 2007

(30) Foreign Application Priority Data

Mar. 23, 2006    (JP)    .............................. 2006-081492

(51) Int. Cl.
*G01W 1/00*    (2006.01)
(52) U.S. Cl. .................................................. 73/170.17
(58) Field of Classification Search ............. 73/170.17; 250/574, 208.1
See application file for complete search history.

(56) References Cited

U.S. PATENT DOCUMENTS 5,710,633 A * 1/1998 Klappenbach et al. ...... 356/445
6,207,967 B1 * 3/2001 Hochstein .................... 250/574
6,250,148 B1 * 6/2001 Lynam ..................... 73/170.17
6,341,523 B2 * 1/2002 Lynam ..................... 73/170.17
6,894,619 B1 * 5/2005 Schmitt et al. .............. 340/604
2001/0018847 A1 * 9/2001 Lynam ..................... 73/170.17
2002/0053237 A1 * 5/2002 Lynam ..................... 73/170.17
2002/0190231 A1 * 12/2002 Kobayashi et al. .......... 250/573
2003/0126924 A1 * 7/2003 Lynam ..................... 73/170.17
2003/0160158 A1 * 8/2003 Ishino et al. ........... 250/227.25

FOREIGN PATENT DOCUMENTS

JP    2001-141645    5/2001

* cited by examiner

*Primary Examiner*—Andre J Allen
(74) *Attorney, Agent, or Firm*—Nixon & Vanderhye, PC (57) ABSTRACT

A raindrop detection device includes a first fixing member which is fixed to a windshield and has a first engagement portion, an inner housing in which a detection unit is accommodated, an outer housing in which the inner housing is accommodated and which is fixed to the inner housing, a second fixing member having a second engagement portion which is detachably engaged with the first engagement portion of the first fixing member, and a leaf spring which is engaged with the inner housing to press and bias the inner housing toward the windshield. The second fixing member has a leaf-spring biasing portion, which contacts the leaf spring to elastically bias the leaf spring toward the windshield at a predetermined pressing force.

11 Claims, 5 Drawing Sheets

RAINDROP DETECTION DEVICE

CROSS REFERENCE TO RELATED APPLICATION

This application is based on a Japanese Patent Application No. 2006-81492 filed on Mar. 23, 2006, the disclosure of which is incorporated herein by reference.

FIELD OF THE INVENTION

The present invention relates to a raindrop detection device which optically detects raindrop adhered to a windshield of a vehicle, for example. More particularly, the present invention relates to a mounting construction of the raindrop detection device.

BACKGROUND OF THE INVENTION

For example, with reference to JP-A-9-510416 (U.S. Pat. No. 5,710,633), a rain sensor (raindrop detection device) of a reflection type is provided. In this case, light is irradiated form a light irradiating portion to a windshield. Reflection light reflected at the windshield is detected by a light receiving portion. Rainfall is detected according to a phenomenon that the amount of the reflection light varies due to the amount of raindrop adhered to the surface of the windshield.

In this case, because of the decrease of the light reflection and the like at the inner surface of the windshield, it is desirable that air layer is not mediate at the light path along which light is back to the light receiving portion from the light irradiating portion through the outer surface of the windshield. Thus, the rain sensor in which the light irradiating portion and the light receiving portion are embedded is pressed against the inner surface of the windshield through a soft translucent sheet. That is, a construction making the rain sensor tightly contact the windshield is used.

Specifically, the rain sensor has an inner housing where a detection system is embedded, an outer housing in which the inner housing is accommodated, an outer-housing fixing arrangement, and a spring. One end of the outer housing is opened to the side of the windshield, and is engaged with the windshield through the outer-housing fixing arrangement. The inner housing is held in the outer housing in such a state that the inner housing is movable with respect to the windshield.

The spring is arranged between the outer housing and the inner housing, to press the inner housing toward the windshield. That is, in the conventional rain sensor, an inner-housing pressing arrangement (called spring-laminating type) where the inner housing and the spring are sequentially arranged between the windshield and the outer housing. In this case, because the spring is arranged between the outer housing and the inner housing, the height of the rain sensor is increased. Thus, the size of the rain sensor is increased.

With reference to JP-A-2001-141645 which has the same applicant as the present application, a raindrop detection device (rain sensor) is provided to restrict the above-described disadvantages of the conventional rain sensor.

According to JP-A-2001-141645, the raindrop detection device has an outer housing, an inner housing, a fixing member, a fixing unit, and a spring. In this case, a pair of springs which are bended are respectively arranged at the two ends of the inner housing. The middle portion of the outer housing protrudes to the front side to be used as a guide. The spring is pressed by the guide to the side of the windshield, so that the inner housing is pressed against the windshield. That is, a construction of a spring-siding type is used.

In this case, the springs are respectively arranged at the two ends of the inner housing. That is, springs are respectively arranged at two sides of a signal detection system (specially, light path system) of the inner housing. Therefore, the spring accommodating space and the light path system of the inner housing can be overlapped to the surface direction of the windshield. Thus, the height (of front-rear direction) of the rain sensor can be reduced.

However, in the above-described rain sensor of the spring-siding type, the variation of the detection signal due to a temperature change or a change over time is large, though the rain sensor becomes compact. In this case, the two ends (of left-right direction) of the outer housing are supported by the windshield through the fixing unit, and the middle portion (of left-right direction) of the outer housing presses the spring toward the windshield. The pressing force varies due to the temperate change and the change over time of the mechanical property and the shape of the outer housing. As a result, there occurs a variation in the shape of the light path portion and the like so that the detection level is changed. Thus, the detection accuracy is deteriorated.

SUMMARY OF THE INVENTION

In view of the above-described disadvantage, it is an object of the present invention to provide a raindrop detection device which has an improved detection accuracy and a compact size.

According to the present invention, the raindrop detection device includes a first fixing member which is fixed to a windshield and has a first engagement portion, a detection unit for optically detecting raindrop adhered to the windshield, an inner housing in which the detection unit is accommodated, an outer housing in which the inner housing is accommodated and which is fixed to the inner housing, a second fixing member having a second engagement portion which is detachably engaged with the first engagement portion of the first fixing member, and a leaf spring which is engaged with the inner housing to press and bias the inner housing toward the windshield. The second fixing member is detachably engaged with the inner housing to detachably fix the inner housing to the first fixing member. The second fixing member has a leaf-spring biasing portion, which contacts the leaf spring to elastically bias the leaf spring toward the windshield at a predetermined pressing force.

That is, because the raindrop detection device (rain sensor) of a spring siding type is used, the leaf spring and the second fixing member can be arranged at the transverse side of the inner housing. Thus, the height of the rain sensor can be reduced. Furthermore, in this case, the second fixing member can engage the inner housing with the first fixing member, and press the leaf spring (having two ends which are supported by inner housing) to the side of the windshield. Therefore, the inner housing can be pressed to the windshield, without increasing the number of the components.

Specially, in this case, the construction where the leaf-spring biasing portion of the second fixing member engaged with the first fixing member directly presses the leaf spring. Thus, there does not exist a long force-transferring path through the outer housing, as compared with a conventional device of the spring siding type where the outer housing engaged with the second fixing member presses the leaf spring. Therefore, according to the present invention, the variation of the elastic deformation of the outer housing due to temperature, the manufacture unevenness and the like can be restricted.

In this case, the variation of the optical path at the inner housing and a translucent sheet between the outer housing and the windshield can be substantially reduced, thus restricting the variation of the detected light amount and the deterioration of the detection accuracy.

Preferably, the inner housing has a pair of leaf-spring engaging portions by which two ends of the leaf spring are supported. A substantial middle portion of a length direction of the leaf spring is elastically biased toward the windshield by the leaf-spring biasing portion of the second fixing member.

Thus, two parts of the two sides of the inner housing can be elastically biased with keeping in balance, by pressing one part of the leaf spring. Therefore, the pressing force to the inner housing can be made even.

Preferably, the outer housing has an opening which is arranged at an end surface of a side of the outer housing. The second fixing member is insertable into the outer housing through the opening in such a state that the second fixing member is substantially parallel with a main plane of the windshield. Thus, the outer housing can be readily fixed to the first fixing member.

In this case, it is desirable that the first fixing member is open in the direction of the acceptance of the second fixing member to have a hook shape. Moreover, it is desirable that the leaf spring, the second fixing member and the first fixing member are arranged at the two sides of the inner housing. Thus, the inner housing can be substantially fixed to the second fixing member, without influencing the operation of the detection unit in the inner housing. Alternatively, the pair of leaf springs which are integrated to have the hook shape can be provided. Alternatively, the first fixing member which is integrated to have the hook shape can be provided.

Preferably, the leaf spring is positioned nearer a side of the windshield than the second fixing member and extends in an insertion direction of the second fixing member.

Thus, the leaf spring can be readily pressed by the second fixing member to the side of the windshield, because of the insertion of the second fixing member.

Preferably, the leaf-spring biasing portion of the second fixing member bends the leaf spring toward the windshield while making a main plane of the leaf spring sliding at the time of an insertion of the second fixing member.

Thus, the outer housing is engaged with the first fixing member. In this case, the leaf spring can be readily pressed to the side of the windshield.

Preferably, a line connecting the second engagement portion of the second fixing member with the leaf spring biasing portion 34 thereof is arranged in substantially parallel with a normal to the windshield.

Thus, the bend at the elastic deformation property of the second fixing member which presses the leaf spring can be substantially reduced, so that the deterioration of the detection accuracy can be restricted.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE EXAMPLED EMBODIMENTS

Exampled Embodiment

A raindrop detection device (rain sensor) according to an exampled embodiment of the present invention will be described with reference to FIGS. 1-6. The raindrop detection device can be used to detect raindrop adhered to a windshield 8 of a vehicle, for example.

Figure 1:
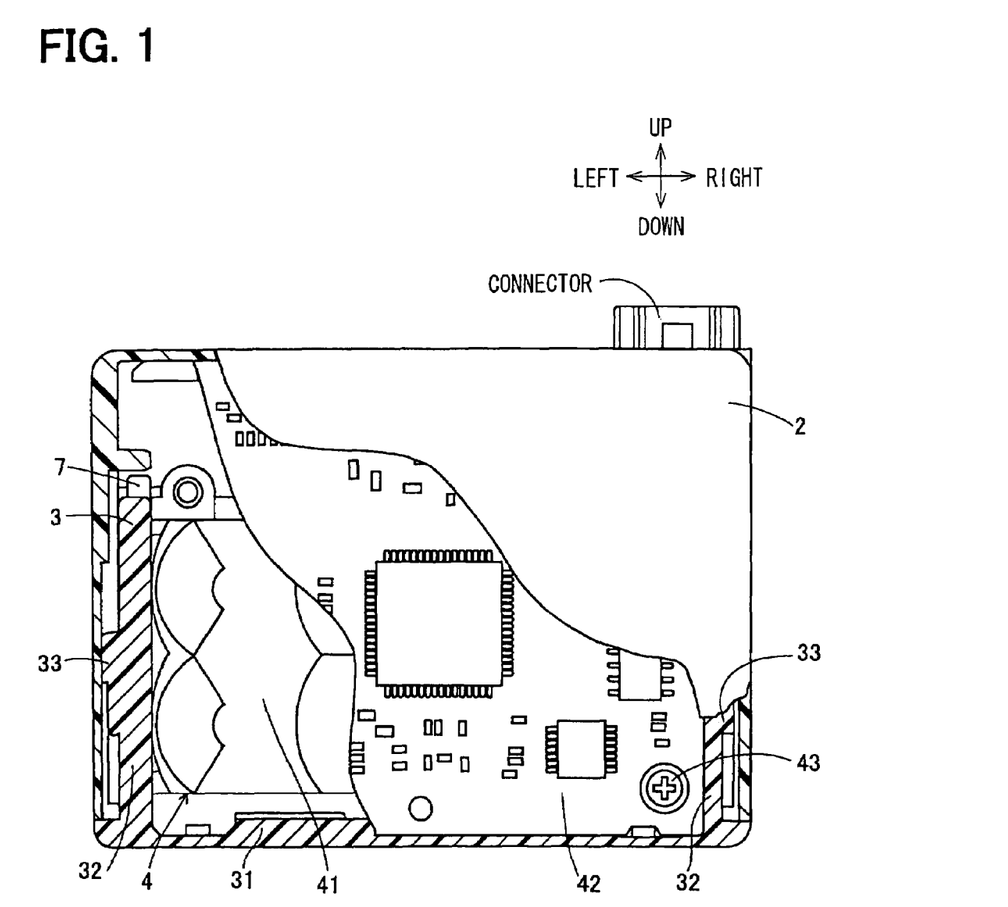
FIG. 1 is a partially sectional plan view showing a raindrop detection device when being viewed in a front-rear direction according to an exampled embodiment of the present invention.
Figure 2:
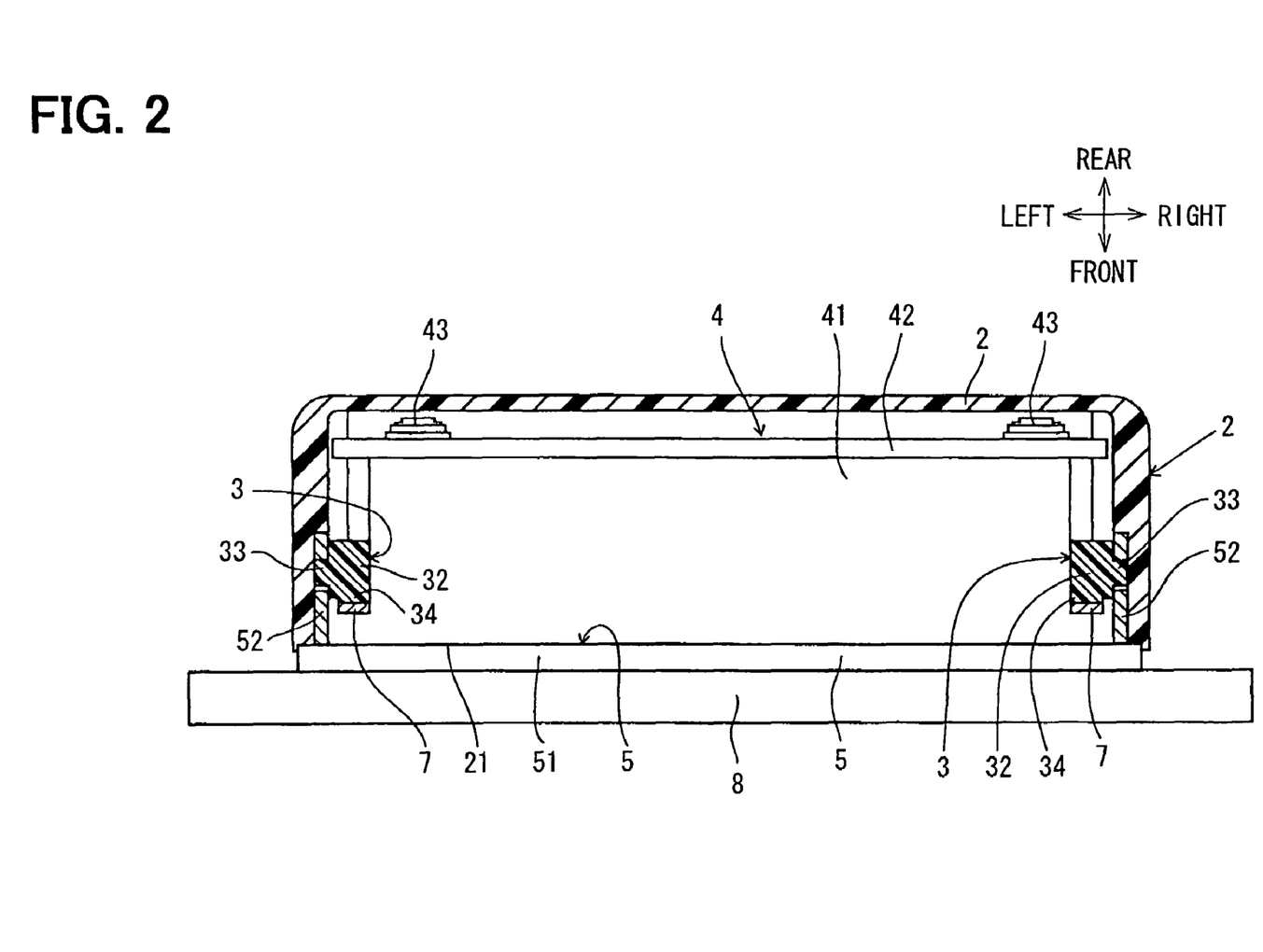
FIG. 2 is a partially sectional view showing the raindrop detection device in FIG. 1 when being viewed in an up-down direction.
Figure 3:
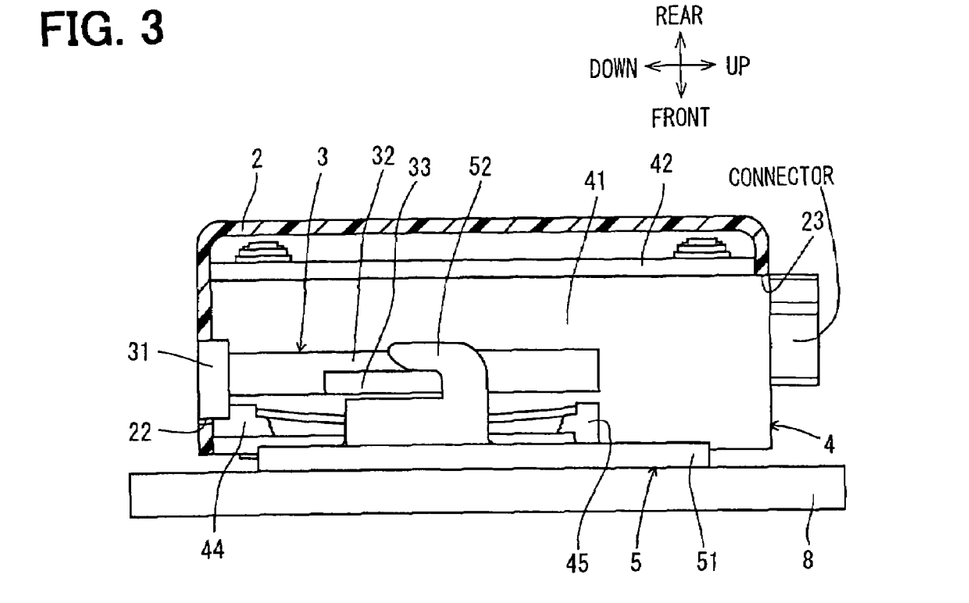
FIG. 3 is a partially sectional view showing the raindrop detection device in FIG. 1 when being viewed in a left-right direction.
Figure 4:
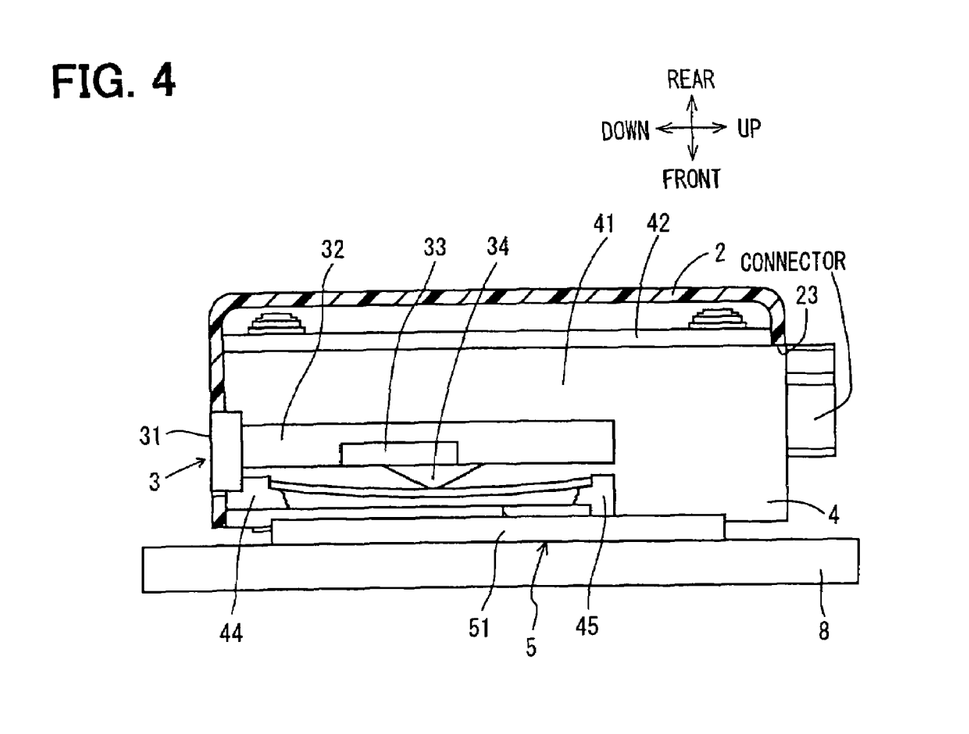
FIG. 4 is a partially sectional view showing the raindrop detection device in FIG. 3 when a first engagement portion of a first fixing unit is omitted.
Figure 5:
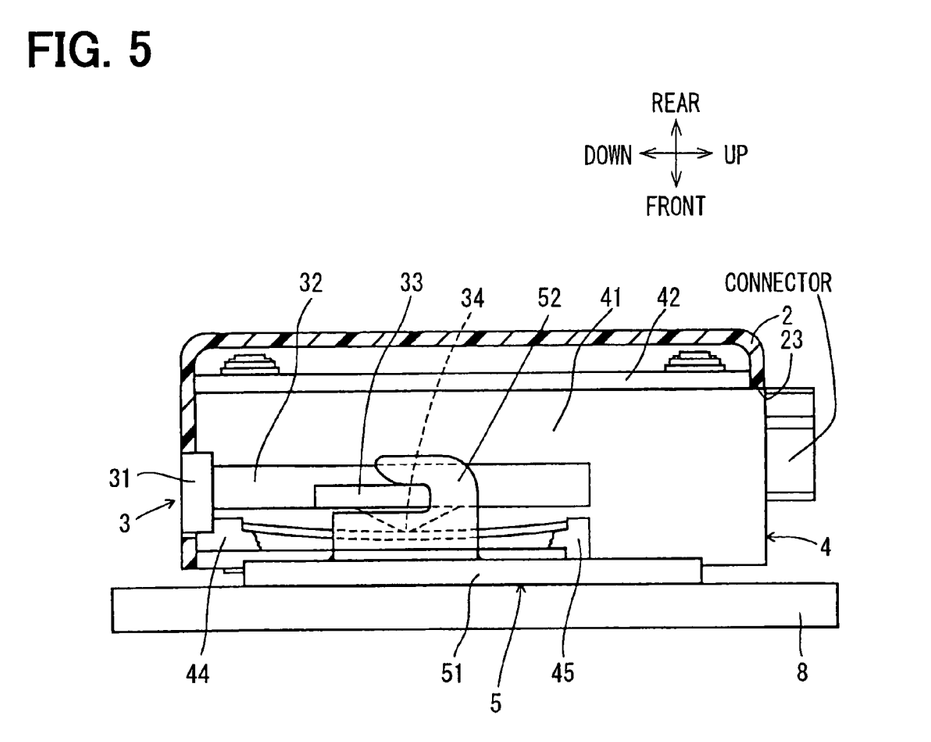
FIG. 5 is a partially sectional view showing the raindrop detection device in FIG. 3 when leaf-spring engaging portions are indicated in broken line.

The raindrop detection device has an outer housing 2, an inner housing 4, a leaf spring 7, a first fixing member 5 and a second fixing member 3. FIG. 1 is a partially sectional plan view showing the raindrop detection device. FIG. 2 is a partially sectional view showing a width direction of the leaf spring 7. FIGS. 3-5 are partially sectional views showing a length direction of the leaf spring 7.

The front-rear direction, the left-right direction and the up-down direction shown in FIGS. 1-5 can respectively correspond to the front-rear direction of the vehicle, the left-right direction of the vehicle and the up-down direction of the vehicle, and are only examples about the directions which are not limited thereto.

The outer housing 2 can be made of a resin and have a substantially square shape, for example. The outer housing 2 has a front opening 21 which is wholly open to face a windshield 8 (of a vehicle, for example), a lower window 22 (referring to FIG. 3) which constructs a part of a lower wall of the outer housing 2, and an upper groove 23 (referring to FIG. 3) in which the inner housing 4 is fitted.

The second fixing member 3 is inserted in the lower window 22 (opening) which is arranged at an end surface (of a side) of the outer housing 2. In this case, the second fixing member 3 can be inserted into the outer housing 2 through the lower window 22, in such a state that the second fixing member 3 is substantially parallel with a main plane of the windshield 8.

As shown FIG. 1, the inner housing 4 which can have a substantially square block shape includes an optical path system 41 (detection unit), and a circuit board 42. The optical path system 41 optically detects raindrop adhered to an outer surface of the windshield 8, from an inner surface (at inner side of a passenger compartment of the vehicle) of the windshield 8. The optical path system 41 and a circuit which receives infrared light or the like to detect raindrop are mounted at the circuit board 42.

The optical path system 41 of the inner housing 4 is pressed against the windshield 8 through a silicon sheet (not shown). The circuit board 42 is fastened to the rear surface of the optical path system 41 by screws 43 or the like. The inner housing 4 is accommodated in the outer housing 2 in such a state that the inner housing 4 is slidably in the front rear direction. Thus, the inner housing 4 can be fitted in the outer housing 2 from the front opening 21 of the outer housing 2. A connector protrudes from the upper surface of the inner housing 4.

The first fixing member 5, which can be manufactured by sheet-metal working, has a body frame portion 51 and a pair of first engagement portions 52. The body frame portion 51 has a substantially square frame shape to surround the optical path system 41 of the inner hours 4 and is bonded to the windshield 8.

The first engagement portions 52 are respectively erected at the right side and the left side of the body frame portion 51, and positioned at the rear side of the body frame portion 51. As shown in FIG. 3, the first engagement portion 52 can have a hook shape, and is open to the lower side for an engagement with the second fixing member 3. In FIG. 1, for the sake of the comprehension, the first engagement portion 52 is not shown.

The second fixing member 3 has a transverse plate portion 31, a pair of longitudinal plate portions 32, a pair of second engagement portions 33 and a pair of leaf-spring biasing portions 34. As shown in FIG. 1, the one longitudinal plate portion 32 which can be constructed of a resin plate having a square-shaped cross section is arranged between a left wall of the inner housing 4 and a left wall of the outer housing 2 and extends to the upper side. The other longitudinal plate portion 32 which can be constructed of a resin plate having a square-shaped cross section is arranged between a right wall of the inner housing 4 and a right wall of the outer housing 2 and extends to the upper side.

The two second engagement portions 33 are respectively integrated with the two longitudinal plate portion 32. The transverse plate portion 31 extends in the vehicle left-right direction, and connects a base end (lower end) of the one longitudinal plate portion 32 with a base end (lower end) of the other longitudinal plate portion 32. The transverse plate portion 31 can be resin-molded integrally with the longitudinal plate portion 32. The transverse plate portion 31 is fitted in the lower window 22 of the outer housing 2 so that the lower window 2 can be shielded.

The second engagement portion 33 protrudes from the outer surface of the transverse plate portion 31 toward the outer housing 2. The second engagement portion 33 is fitted in the first engagement portion 52 (having hook shape) of the first fixing member 5 from the lower side, so that the second engagement portion 33 becomes unmovable with respect to the first engagement portion 52 in the front rear direction.

The second engagement portion 33 and the transverse plate portion 31 are engaged with the outer housing 2. The outer housing 2 is substantially unmovable with respect to the second engagement portion 33 and the transverse plate portion 31 in the front rear direction. Thus, the outer housing 2 is unmovably supported by the first fixing member 5 in the front rear direction, by fitting the second engagement portion 33 of the second fixing member 3 in the first engagement portion 52 of the first fixing member 5.

In this case, the second engagement portion 33 of the second fixing member 3 is detachably engaged with the first engagement portion 52 of the first fixing member 5. The second fixing member 3 is detachably engaged with the inner housing 4, to detachably fix the inner housing 4 to the first fixing member 5.

The leaf-spring biasing portion 34 is a taper-shaped protrusion which protrudes from the longitudinal plate portion 32 to the front side, and is arranged at a substantially same position with the second engagement portion 33 in the vehicle up-down direction. The leaf-spring biasing portion 34 can be resin-molded integrally with the longitudinal plate portion 32.

Because the leaf-spring biasing portion 34 is arranged adjacently to the inner side of the first engagement portion 52 of the first fixing member 5, the leaf-spring biasing portion 34 cannot be sufficiently shown in FIG. 3. In this case, FIG. 4 shows the raindrop detection device in FIG. 3 when the depiction of the first engagement portion 52 of the first fixing member 5 is omitted. FIG. 5 shows the raindrop detection device in FIG. 3 when leaf-spring engaging portions 44 and 45 are indicated in broken line.

The leaf-spring biasing portion 34 contacts the leaf spring 7 to elastically bias the leaf spring 7 toward the windshield 8 at a predetermined pressing force.

The leaf spring 7 is arranged in substantially parallel with the windshield 8 and extends in the up down direction. The two leaf springs 7 are respectively arranged at the right side and the left side of the inner housing 4.

The leaf spring 7 is positioned nearer a side of the windshield 8 than the second fixing member 3 and extends in the insertion direction of the second fixing member 3.

The two ends of the leaf spring 7 are supported by the pair of leaf-spring engaging portions 44 and 45 which are arranged at the outer surface of the side wall of the inner housing 4 and protrude therefrom. In FIG. 1, the leaf-spring engaging portions 44 and 45 are omitted for the sake of comprehension.

The leaf-spring engaging portions 44 and 45 are arranged to space from each other with a predetermined distance in the vehicle up-down direction, to be used as stoppers for maintaining the distance between the windshield 8 and the two ends of the leaf spring 7 as a predetermined value. What is important is that the positions of the leaf-spring engaging portions 44 and 45 are set, in such a manner that a flat main plane (at rear side) of the leaf spring 7 engaged with the leaf-spring engaging portions 44 and 45 is bent to the side of the windshield 8 (i.e., front side) by the leaf-spring biasing portion 34 of the second fixing member 3 at the time of the insertion of the second fixing member 3.

The leaf spring 7 is engaged with the inner housing 4 in such a manner that the leaf spring 7 is capable of pressing and biasing the inner housing 4 toward the windshield 8.

Next, the assembling sequence of the raindrop detection device will be described.

At first, the body frame portion 51 of the first fixing member 5 is bonded to the windshield 8. In this case, the silicon sheet (not shown) is, for example, bonded to the inner side of the windshield 8.

Then, the outer housing 2 is arranged to cover the outer side of the pair of the first engagement portion 52 of the first fixing member 5 and a light receiving surface of the optical path system 41 of the inner housing 4 is arranged to tightly contact the silicon sheet, in such a state that the inner housing 4 and the outer housing 2 are engaged with each other in the diagrammatically front rear direction. In this case, the two ends of the leaf spring 7 are respectively engaged with the leaf-spring engaging portions 44 and 45 of the inner housing 4.

Next, the pair of longitudinal plates 32 of the second fixing member 3 (having hook shape) is inserted-in to the upper side from the lower window 22 of the outer housing 2, as a whole. Furthermore, the longitudinal plate portion 32 of the second fixing member 3 is pressed-in between the side wall of the outer housing 2 and the side wall of the inner housing 4.

As a result, the leaf-spring biasing portion 34 which protrudes from the surface (of the side of windshield 8) of the longitudinal plate portion 32 bends the leaf spring 7 to the side of the windshield 8, while the main plane (of rear side) of the leaf spring 7 is made sliding to the upper side and along the upper side. Thus, the leaf-spring engaging portions 44 and 45 (totaling four) which are respectively arranged at four corners of the optical path system 41 and positioned adjacently to each other press the two ends of the leaf spring 7 toward the silicon sheet by a predetermined press force.

Alternatively, a temporary assembly can be also beforehand prepared. The temporary assembly can be constructed by assembling the inner housing 4, the outer housing 2 and the leaf spring 7 and further partially inserting the second fixing member 3 therein. Then, after the temporary assembly is set to the first fixing member 5, the second fixing member 3 is pressed therein. Thus, the assembling is finished.

According to this embodiment, the raindrop detection device slantways irradiates the infrared light toward the windshield 8, from a light-emitting diode (which is fixed at circuit board 42) through the optical path system 41 and the silicon sheet.

An optoelectronic transducer mounted at the circuit board 42 optoelectronicly transduces the reflected light from the outer surface of the windshield 8, to determine a rainfall via a signal processing circuit mounted at the circuit board 42.

Next, the effects of the raindrop detection device will be described with reference to FIGS. 6 and 7.

Figure 6:
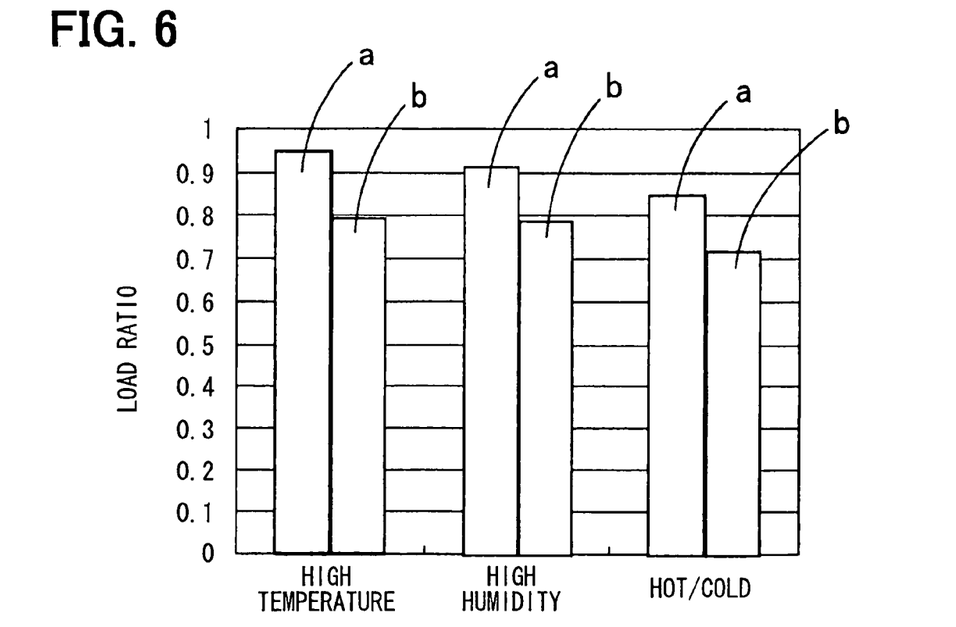
FIG. 6 is a graph showing load variations of the raindrop detection device according to the exampled embodiment and a raindrop detection device according to a comparison example due to temperature and humidity.

FIG. 6 shows ratios of loads which respectively presses the windshield 8 by the rain sensor of this embodiment and that of a comparison example according to JP-A-2001-141645, after endurance tests respectively performed under a high temperature condition, a high humidity condition and a hot/cold condition in the case where a standard load applied to the inner housing 4 is set as a criterion under a predetermined standard condition.

Figure 7:
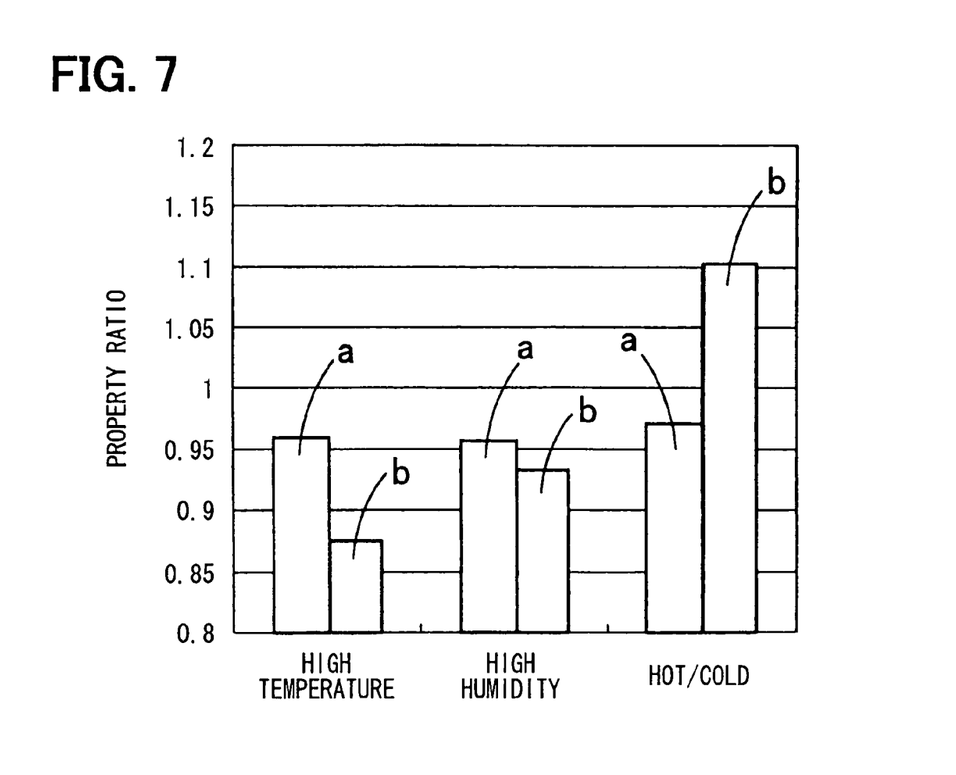
FIG. 7 is a graph showing output property variations of the raindrop detection device according to the exampled embodiment and the raindrop detection device according to the comparison example due to temperature and humidity.

FIG. 7 shows ratios of outputs (i.e., property ratios) of the rain sensor of this embodiment and that of the comparison example according to JP-A-2001-141645, after endurance tests which are respectively performed under a high temperature condition, a high humidity condition and a hot/cold condition in the case where an output (obtained in a state where a standard load is applied to the inner housing 4 under a predetermined standard condition) is set as a criterion.

In FIGS. 6 and 7, the rain sensor of this embodiment and that of the comparison example according to JP-A-2001-141645 are respectively indicated by "a" and "b".

With reference to FIGS. 6 and 7, according to this embodiment, the load variation of the rain sensor by the endurance tests with the temperature change and humidity change is little. Therefore, the output change is small.

Other Embodiments

Although the present invention has been fully described in connection with the preferred embodiments thereof with reference to the accompanying drawings, it is to be noted that various changes and modifications will become apparent to those skilled in the art.

According to the above-described embodiment, the inner housing 4 and the outer housing 2 are separately constructed. However, if the inner housing 4 is movable at only a predetermined small distance in the thickness direction of the inner housing 4 with respect to the outer housing 2, it is not required that the inner housing 4 and the outer housing 2 are constructed completely separately.

According to the above-described embodiment, the leaf spring 7 is arranged in such a state that the length direction and the width direction of the leaf spring 7 are in parallel with the main plane of the windshield 8. However, the leaf spring 7 can be also arranged in such a state that the length direction and the width direction of the leaf spring 7 are slightly slant with respect to the main plane of the windshield 8.

In the above-described embodiment, the leaf spring 7 can be constructed of the flat leaf spring. However, the leaf spring 7 can also have a slight flection or a slight bend to the thickness direction thereof.

In the above-described embodiment, the front end of the leaf-spring biasing portion 34 of the second fixing member 3 can resiliently bias the leaf spring 7 at the middle position of the length direction of the leaf spring 7, toward the windshield 8. However, the front end of the leaf spring biasing portion 34 of the second fixing member 3 can also resiliently bias the leaf spring 7 at a position which slightly deviates from the middle position in the front rear direction.

In the above-described embodiment, the substantial engagement point of the second engagement portion 33 of the second fixing member 3, and the front end (which is substantial biasing point of leaf spring biasing portion 34) of the leaf-spring biasing portion 34 are arranged to substantially completely coincide with each other in the front rear direction. Therefore, the transferring path from the first fixing member 5 to the leaf spring 7 is extremely short, so that the variation of the force transferring property of the transferring path can be reduced. Thus, the detection accuracy can be improved.

Alternatively, the detection accuracy can be also improved by the following arrangement. That is, a line connecting the substantial engagement point of the second engagement portion 33 of the second fixing member 3 with the front end (which is substantial biasing point of leaf-spring biasing portion 34) of the leaf-spring biasing portion 34 is arranged in substantially parallel with the normal to the windshield 8. In this case, the detection accuracy can be improved.

Such changes and modifications are to be understood as being in the scope of the present invention as defined by the appended claims.

What is claimed is:

1. A raindrop detection device, comprising:
   a first fixing member which is fixed to a windshield and has a first engagement portion;
   a detection unit for optically detecting raindrop adhered to the windshield;
   an inner housing in which the detection unit is accommodated;
   an outer housing in which the inner housing is accommodated and which is fixed to the inner housing;
   a second fixing member having a second engagement portion which is detachably engaged with the first engagement portion of the first fixing member, the second fixing member being detachably engaged with the inner housing to detachably fix the inner housing to the first fixing member; and
   a leaf spring which is engaged with the inner housing to press and bias the inner housing toward the windshield, wherein
   the second fixing member has a leaf-spring biasing portion, which contacts the leaf spring mounted to the inner housing to elastically bias the leaf spring toward the windshield at a predetermined pressing force.

2. The raindrop detection device according to claim 1, wherein
a length direction and a width direction of the leaf spring are substantially parallel with a main plane of the windshield.

3. The raindrop detection device according to claim 1, wherein the leaf spring is a flat leaf spring.

4. The raindrop detection device according to claim 1, wherein:
the inner housing has a pair of leaf-spring engaging portions by which two ends of the leaf spring are supported; and
a substantial middle portion of a length direction of the leaf spring is elastically biased toward the windshield by the leaf-spring biasing portion of the second fixing member.

5. The raindrop detection device according to claim 4, wherein
the outer housing has an opening which is arranged at an end surface of a side of the outer housing, the second fixing member being insertable into the outer housing through the opening in such a state that the second fixing member is substantially parallel with a main plane of the windshield.

6. The raindrop detection device according to claim 5, wherein
the leaf spring is positioned nearer a side of the windshield than the second fixing member and extends in an insertion direction of the second fixing member.

7. The raindrop detection device according to claim 6, wherein
the leaf-spring biasing portion of the second fixing member bends the leaf spring toward the windshield while making a main plane of the leaf spring sliding, when the second fixing member is inserted into the outer housing.

8. The raindrop detection device according to claim 6, wherein
a line connecting the second engagement portion of the second fixing member with the leaf-spring biasing portion thereof is substantially parallel with a normal to the windshield.

9. The raindrop detection device according to claim 1, wherein the first fixing member is bonded to the windshield.

10. The raindrop detection device according to claim 4, wherein
the leaf-spring engaging portion is arranged at an outer surface of a side wall of the inner housing, and protrudes from the outer surface.

11. The raindrop detection device according to claim 1, wherein
the leaf-spring biasing portion is a taper-shaped protrusion, and is arranged at a substantially same position as the second engagement portion in the up-down direction.

* * * * *